United States Patent
Wadzinski et al.

(10) Patent No.: US 9,848,531 B2
(45) Date of Patent: Dec. 26, 2017

(54) VERTICAL STORAGE GROUNDS MAINTENANCE APPARATUS

(71) Applicant: The Toro Company, Bloomington, MN (US)

(72) Inventors: Chris A. Wadzinski, Inver Grove Heights, MN (US); John O. Hurst, Lakeville, MN (US); Khari S. Clarke, Minneapolis, MN (US); John T. Gill, Savage, MN (US); Ryan M. Petersen, Shoreview, MN (US); Mark C. Daly, Minnetonka, MN (US)

(73) Assignee: THE TORO COMPANY, Bloomington, MN (US)

( * ) Notice: Subject to any disclaimer, the term of this patent is extended or adjusted under 35 U.S.C. 154(b) by 351 days.

(21) Appl. No.: 14/595,657

(22) Filed: Jan. 13, 2015

(65) Prior Publication Data

US 2016/0198627 A1    Jul. 14, 2016

(51) Int. Cl.
| | |
|---|---|
| A01D 34/835 | (2006.01) |
| A01D 34/81 | (2006.01) |
| A01D 34/82 | (2006.01) |
| A01D 34/00 | (2006.01) |

(52) U.S. Cl.
CPC ......... *A01D 34/824* (2013.01); *A01D 34/001* (2013.01)

(58) Field of Classification Search
CPC ...... A01D 34/00; A01D 34/001; A01D 34/08; A01D 34/824; B62B 1/00; B62B 1/208; B62B 3/02
USPC ............... 56/320.1, DIG. 18; 280/656, 655.1
See application file for complete search history.

(56) References Cited

U.S. PATENT DOCUMENTS

| | | | | |
|---|---|---|---|---|
| 4,480,851 A * | 11/1984 | St-Pierre | ............. | B62D 63/061 180/209 |
| 4,765,642 A * | 8/1988 | Struzina | ............. | B62D 63/061 280/43.24 |
| 4,770,440 A * | 9/1988 | Lander | ................ | A01D 34/001 224/401 |
| 5,261,215 A | 11/1993 | Hartz et al. | | |
| 5,340,145 A * | 8/1994 | Leib | ..................... | B62D 63/061 280/491.1 |
| 6,615,434 B1 * | 9/2003 | Davis | .................... | A47L 11/185 15/302 |
| 7,258,362 B2 | 8/2007 | Thurm | | |
| 7,784,147 B2 * | 8/2010 | Burkholder | ............. | A47L 11/03 118/207 |
| 2013/0111866 A1 | 5/2013 | Schmalz | | |
| 2013/0111867 A1 | 5/2013 | Schmalz | | |
| 2014/0102064 A1 * | 4/2014 | Yamaoka | ............ | A01D 34/824 56/10.5 |

OTHER PUBLICATIONS

Black & Decker Instruction Manual for 19 Inch (483mm) Cordless Mulching Rear Bag Mower. Catalog No. CM1936, Oct. 2010; 47 pages.

* cited by examiner

*Primary Examiner* — John G Weiss
(74) *Attorney, Agent, or Firm* — Mueting, Raasch & Gebhardt, P.A.

(57) ABSTRACT

A grounds maintenance apparatus such as a lawn mower adapted for movement from a horizontal operating orientation to a vertical storage orientation. Embodiments of the apparatus provide supplemental storage wheels adapted to permit rolling of the apparatus over a ground surface while in the vertical storage orientation.

9 Claims, 14 Drawing Sheets

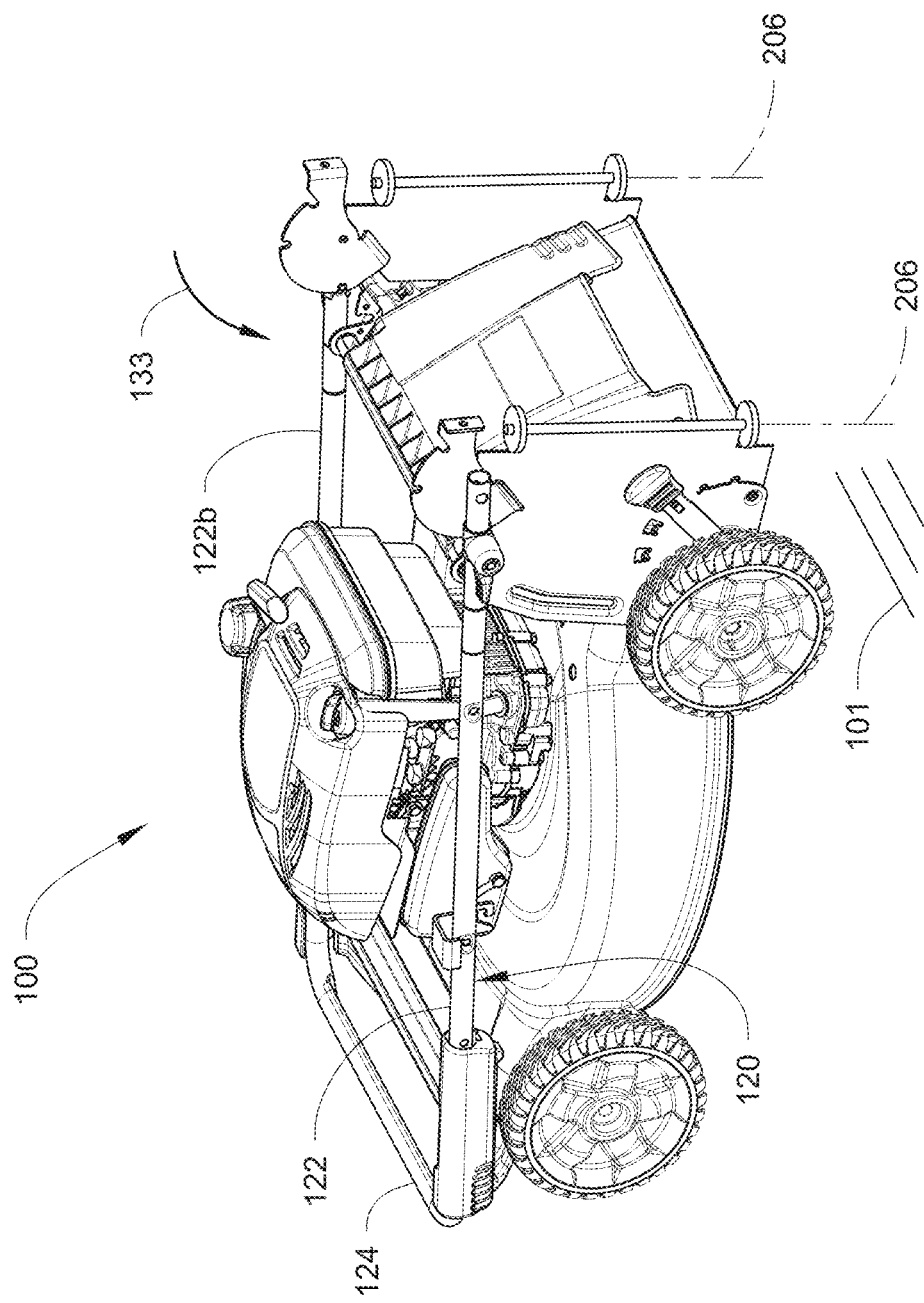

VERTICAL STORAGE GROUNDS MAINTENANCE APPARATUS

Embodiments described herein are directed to grounds maintenance apparatus such as lawn mowers, and more particularly, to apparatus and methods to assist with storing such grounds maintenance apparatus.

BACKGROUND

Grounds maintenance apparatus such as lawn mowers are known. A common mower design is the push or self-propelled, walk behind mower with a horizontal cutting deck. In its horizontal operating orientation, the deck is generally supported above a ground surface by a plurality of support wheels. When not in use, the mower is typically stored in a storage location (e.g., garage) with the deck in the same horizontal operating orientation.

SUMMARY

Embodiments described herein may provide a grounds maintenance apparatus that includes a body supporting a ground-working tool, wherein the body has front and rear sides and left and right sides. A plurality of support wheels are mounted to the body and adapted to support the body in rolling engagement with a ground surface while the body is in a horizontal operating orientation. Two or more storage wheels are connected to the body along one of the sides. The storage wheels are elevated above the ground surface when the body is in the horizontal operating orientation, and are in contact with the ground surface when the body is in a vertical storage orientation.

In another embodiment, a lawn mower is provided that includes a deck having an upper wall and downwardly extending sidewalls that together define a cutting chamber, wherein the deck comprises front and rear sides and left and right sides. A plurality of support wheels are mounted to the deck and adapted to support the deck in rolling engagement with a ground surface when the mower is in a horizontal operating orientation. Two or more storage wheels are mounted to the deck along one of the front, rear, left, or right sides. The storage wheels are elevated above the ground surface when the mower is in the horizontal operating orientation, and are in contact with the ground surface when the mower is in a vertical storage orientation.

In yet another embodiment, a method of storing a walk-behind lawn mower is provided that includes: moving a handle assembly of the mower from an operating position to a collapsed position; lifting a first side of the deck of the mower until ground support wheels at or near the first side of the deck are elevated above a ground surface; and supporting the mower, in a vertical storage position upon the ground surface, with one or more a storage wheels located along a second side of the deck opposite the first side.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein:

FIG. 3 is a perspective view of the mower of FIG. 1 with the mower in the horizontal operating orientation and with the handle assembly shown in the collapsed position;

FIGS. 4A and 4B are enlarged views of portions of the mower or FIG. 3 illustrating an exemplary interconnection of the handle assembly to the deck of the mower, wherein: FIG. 4A illustrates a first or left side interconnection; and FIG. 4B illustrates a second or right side interconnection;

FIGS. 14A-14B are partial side elevation views of a lawn mower (similar to the mower shown, e.g., in FIGS. 8-10) incorporating storage wheels in accordance with yet another embodiment, wherein: FIG. 14A illustrates the mower in the horizontal operating orientation and the handle assembly shown in the operating position; and FIG. 14B illustrates the mower after movement of the handle assembly to the collapsed position.

Figure 1:
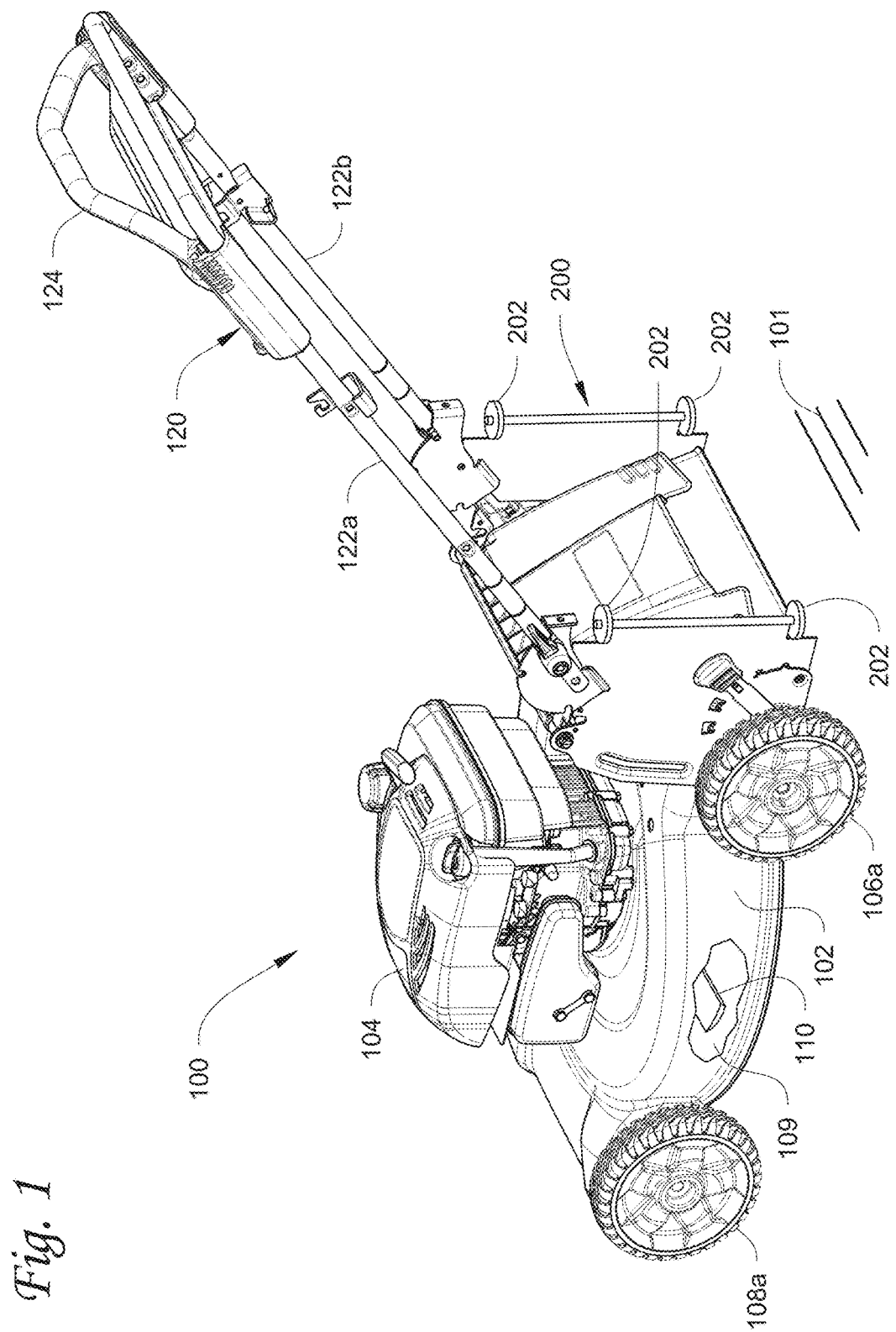
FIG. 1 is a perspective view of a grounds maintenance apparatus, e.g., a walk-behind lawn mower having a body or deck, incorporating storage wheels in accordance with one embodiment of the disclosure, the mower shown in a horizontal operating orientation with a handle assembly of the mower shown in an operating position.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may or may not be specifically described and/or illustrated herein, are contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.), in the specification and claims are understood as being modified by the term "about."

In some embodiments, a grounds maintenance apparatus (e.g., power equipment unit such as a lawn mower) is provided that includes a body (e.g., deck) supporting a ground-working tool (e.g., cutting blade). The body may include multiple sides such as front, rear, left, and right sides. A plurality of support wheels may be connected to the body and adapted to support the body in rolling engagement with a ground surface while the apparatus (e.g., the body) is in a horizontal operating orientation. Moreover, two or more storage wheels may be connected to the body (e.g., connected either directly or indirectly (e.g., via a moving handle assembly) to the body) along one of the sides, wherein the storage wheels are elevated above the ground surface when the body is in the horizontal operating orientation, and are in contact with, and at least partially support the body in rolling engagement with, the ground surface when the apparatus (e.g., body) is in a vertical storage orientation.

Embodiments of the present disclosure may also provide a method for storing a walk-behind power equipment unit such as a mower. Such methods may involve moving a handle assembly of the mower from an operating position to a collapsed position while a deck of the mower is in a horizontal operating orientation. The method may further include: lifting a first side of the deck of the mower until ground support wheels at or near the first side of the deck are elevated above a ground surface; and supporting the mower, in a vertical storage position upon the ground surface, with one or more storage wheels located along a second side of the deck opposite the first side.

In some embodiments, the body of the apparatus moves 80-100 degrees, e.g., 90 degrees, between the horizontal operating orientation and the vertical storage orientation. Moreover, the apparatus may include a handle assembly to permit physical operator interaction with the body. The handle assembly may be movable between an operating position, corresponding to the apparatus being in the horizontal operating orientation, and a collapsed position, accommodating the apparatus in the vertical storage orientation.

With reference to the figures of the drawing, wherein like reference numerals designate like parts and assemblies throughout the several views, FIG. 1 illustrates an exemplary embodiment of such a grounds maintenance apparatus. While not wishing to be bound to a specific configuration, the grounds maintenance apparatus may, in one embodiment, be configured as a walk-behind or walk-power mower 100 having a rearwardly extending operator handle assembly, the mower shown configured in FIG. 1 in a mulching mode. When operating in an alternative mode (e.g., bagging mode), a grass catcher (not shown) may be attached to the mower to collect grass clippings for later disposal.

While shown as a walk-behind mower, the grounds maintenance apparatus could be configured as most any ground working device including, e.g., a snowthrower, cultivator, dethatcher, aerator, etc.

Figure 2:
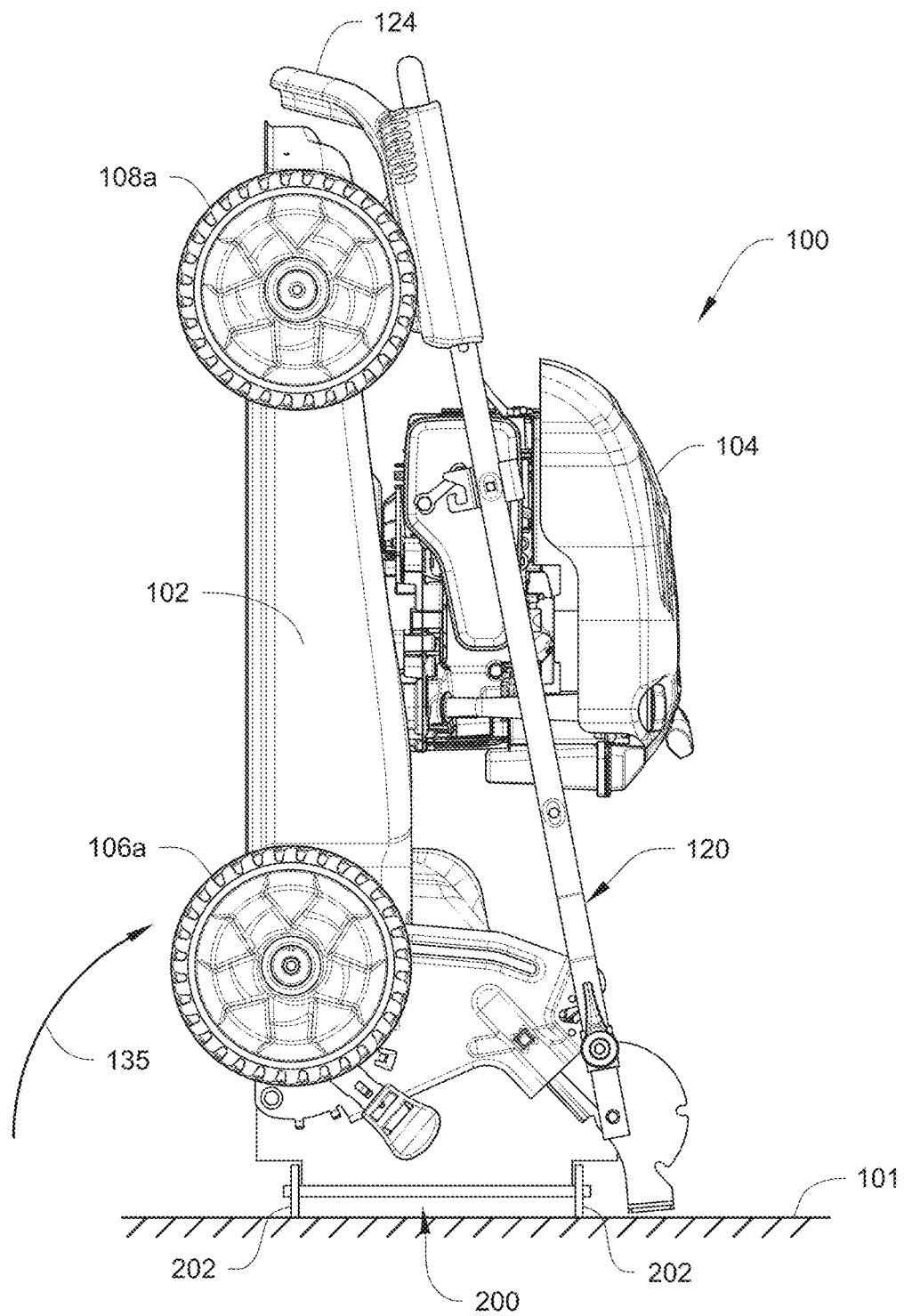
FIG. 2 is a side elevation view of the mower of FIG. 1 after movement of: the handle assembly to a collapsed position; and the mower to a vertical storage orientation.

The mower 100 may include features, e.g., fluid containment, carburetion, etc., that permit the mower to be oriented in the horizontal operating orientation as shown in FIG. 1, or in the vertical storage orientation shown in FIG. 2 without leakage of fluids (e.g., fuel, oil). Some embodiments described herein permit such vertical storage by including secondary storage wheels that engage a ground surface when the mower is in the vertical storage orientation. As a result, the mower may be easily moved (e.g., rolled upon the ground surface) while in the vertical storage orientation.

It is noted that the terms "comprises" and variations thereof do not have a limiting meaning where these terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are (unless otherwise noted) from the perspective of one operating the mower 100 while the mower is in the horizontal operating orientation, e.g., while the mower 100 is positioned such that wheels 106 and 108 rest upon a generally horizontal ground surface 101 as shown in FIG. 1. These terms are used only to simplify the description, however, and not to limit the interpretation of any embodiment described.

Still further, the suffixes "a" and "b" may be used throughout this description to denote various left- and right-side parts/features, respectively. However, in most pertinent respects, the parts/features denoted with "a" and "b" suffixes are substantially identical to, or mirror images of, one another. It is understood that, unless otherwise noted, the description of an individual part/feature (e.g., part/feature identified with an "a" suffix) also applies to the opposing part/feature (e.g., part/feature identified with a "b" suffix). Similarly, the description of a part/feature identified with no suffix may apply, unless noted otherwise, to both the corresponding left and right part/feature.

While the general construction of the mower 100 is not necessarily central to an understanding of exemplary embodiments (e.g., other mower configurations are certainly contemplated), an exemplary mower 100 is briefly described below. In some embodiments, the exemplary mower may incorporate aspects of mowers described in US-2003-0182919 to Baumann et al.

With reference to FIG. 1, the exemplary mower 100 may include a body (e.g., deck 102) having front and rear sides or edges, and left and right sides or edges. The mower 100 may further include, for supporting the mower 100/deck 102 in rolling engagement with a ground or lawn surface 101, a plurality of ground-engaging support wheels. For example, rear wheels 106 (e.g., left and right rear wheels 106a, 106b located at or near the rear side (e.g., each rear corner) of the deck) and front wheels 108 (left and right front wheels 108a, 108b located at or near the front side (e.g., each front corner) of the deck) may be provided (see also FIG. 5). The deck 102 may include an upper wall and one or more downwardly extending sidewalls that together define a downwardly (as viewed in FIG. 1) opening cutting chamber 109. The mower 100 may also include a prime mover, e.g., an internal combustion engine 104 that, in one embodiment, is mounted on the upper wall of the deck. While illustrated herein as an internal combustion engine 104, alternative power systems, such as an AC- or DC-powered electric motor, are also contemplated.

The engine 104 may be oriented such that its crankshaft (not shown) extends vertically downward (in FIG. 1)

through the upper wall of the deck 102 and into the cutting chamber. A ground-working tool (e.g., cutting member or blade 110) may attach to an end of the crankshaft. During operation, the crankshaft rotates the cutting blade at a speed sufficient to sever grass and other vegetation over which the mower 100 passes.

As stated above, the mower 100 may be self-propelled in that one or more of its wheels 106, 108 may receive driving power from the engine 104 via a transmission system (not shown). For example, the transmission may drive the wheels 106, 108 in any combination (e.g., one or both of the front wheels, one or both of the rear wheels, one front and one rear wheel, or all four of the wheels may be driven). Alternatively, the wheels may be passive (e.g., non-driven), in which case the mower may be propelled by the operator pushing on the handle assembly (described below).

The mower 100 may be configured for various operating modes. For example, the deck 102 may be configured for ejecting grass clippings cut by the mower into a grass catcher (not shown) when the mower is in a bagging mode. The mower 100 may further include a side discharge outlet (not shown) for ejecting grass clippings to the side of the mower when the mower is operating in a side discharge mode. Finally, the mower may be configured as shown in FIG. 1 in a mulching mode. In the mulching mode, grass clippings are contained within the deck 102 during mowing, resulting in repeated cutting of the clippings before they are returned to the ground surface 101.

In some embodiments, the mower 100 may include a handle assembly 120 formed by one or more handle members or tubes 122 that attach to the deck 102 and extend generally upwardly and rearwardly as shown in FIG. 1. In the illustrated embodiment, the handle members 122 are laterally spaced-apart and parallel as shown. The handle assembly 120 may further include one or more grip handles 124 located at or near a distal (upper) end. The grip handle(s) 124 may connect the upper ends of the handle members 122 to produce, as shown in FIG. 1, a generally U-shaped handle assembly.

The handle assembly 120 (e.g., the handle members 122 and/or the grip handle 124) may include various controls (e.g., drive transmission, operator presence control, etc.) for operating the mower. As a result, an operator walking behind the mower 100 may grasp the grip handle and control mower operation via manipulation of the grip handle and/or the various controls located thereon. In some embodiments, the handle assembly 120/grip handle 124 may be configured as generally described in U.S. Pat. No. 6,082,083 to Stalpes et al.

During operation, the mower 100 (e.g., the deck 102) may be configured in the horizontal operating orientation as shown in FIG. 1, e.g., with the wheels 106, 108 resting upon the ground surface 101. However, to minimize storage space when not in use, embodiments of the mower 100 may be configured to move to a vertical storage orientation as shown in FIG. 2. To assist the operator with movement of the mower 100 when the latter is in the vertical storage configuration of FIG. 2, embodiments of the mower may include a storage carriage 200 that includes one or more, e.g., two or more, secondary storage wheels 202 as shown.

As will become evident, the number and configuration of the storage wheels 202 may vary. Moreover, in some embodiments, one or more of the main support wheels (e.g., rear wheels 106) may be reconfigured to function as a storage wheel when the mower is in the vertical storage orientation as further described below.

In order to reconfigure the mower 100 from the horizontal operating orientation of FIG. 1 to the vertical storage orientation of FIG. 2, it may be necessary, at least in some embodiments, to first move the handle assembly 120 from an operating position as shown in FIG. 1 (where the handle tubes extend rearwardly beyond the rear side of the deck), to a collapsed position as shown in FIG. 3 (wherein at least part of the handle tubes are located forward of the rear side of the deck).

While shown as incorporating a handle assembly 120, such a feature may be unnecessary for some mowers and for other grounds maintenance apparatus. For example, a robotic mower may have no need for an operator handle of the construction illustrated herein. Accordingly, the description of the handle assembly and its reconfiguration are exemplary only and would not apply to all embodiments.

Figure 4A:
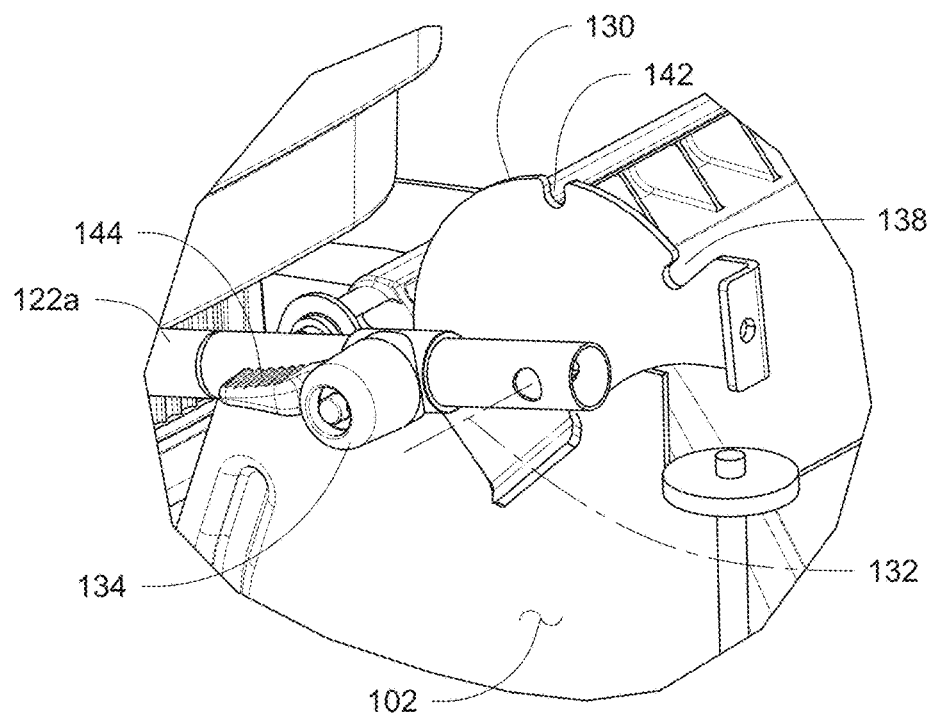
Figure 4B:
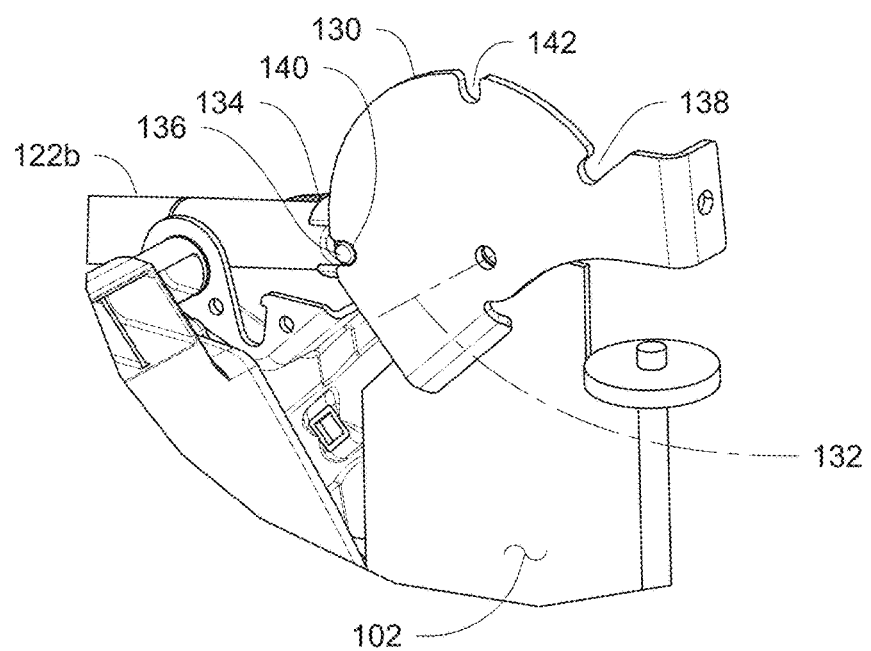

FIGS. 4A and 4B illustrate an exemplary interconnection of the handle assembly, e.g., interconnection between the deck 102 and the handle tubes 122a and 122b. As shown in these views, each handle tube 122 may be pivotally connected to an index plate 130 of the deck 102 via a fastener (not shown). In the illustrated embodiment, the index plates 130 are generally vertical to provide a transverse pivot axis 132 about which the handle assembly 120 (the tubes 122) may pivot.

Offset from the pivot axis 132 on each of the handle members 122 is a retractable pin assembly 134. Each of the pin assemblies 134 may include a biased pin 136 (see FIG. 4B) that may seat within a notch formed in the index plate 132. For example, when the handle assembly 120 is in the operating position of FIG. 1 (corresponding to the mower being in the horizontal operating orientation), the pins 136 may be engaged with notches 138. Conversely, when the handle assembly 120 is in the collapsed position of FIGS. 4A and 4B (which will accommodate the deck being in the vertical storage orientation), the pins 136 may be engaged with notches 140 (visible in FIG. 4B only). Intermediate notches (e.g., notches 142) may also be provided to support the handle assembly 120 in at least one intermediate position.

In some embodiments, each pin assembly 134 comprises a lever 144. By rotating the lever 144, e.g., a quarter-turn, the pin assembly may withdraw the biased pin 136 (e.g., from the notches 138, 140, 142) sufficiently to permit the handle assembly 120 to pivot about the axis 132 relative to the index plate 130. Once the pin 136 is withdrawn and the handle assembly 120 pivoted slightly, the handle assembly 120 may continue to be pivoted until the pins align with another one of the notches 138, 140, 142, at which point the pin assembly 134 biases the pin 136 into engagement with the respective notch. As a result, the mower operator may move the handle assembly 120 from the operating position of FIG. 1 to the collapsed position of FIG. 3 by simply rotating each lever 144 a quarter turn and holding the levers until the handle assembly is manually rotated (e.g., in the direction 133 of FIG. 3) past the notches 142. The levers 144 may then be released and the handle assembly 120 rotated until the pins 136 reach and engage the notches 140 corresponding to the handle assembly 120 being in the collapsed position of FIG. 3.

The engagement of the pins 136 with the notches 138, 140, and 142, may be configured to securely maintain the handle assembly 120 in the desired position until the operator again intentionally manipulates the pin assemblies 134. While shown as using the pin assemblies 134, other suitable handle interconnections are contemplated.

Once the handle assembly reaches the collapsed position of FIG. 3, the mower 100 (e.g., the deck 102) may be rotated as indicated by arrow 135 in FIG. 2. Such rotation may lift the front wheels 108 and raise them above the ground surface 101 (and above the rear wheels 106) as shown. While shown as lifting a front side of the deck and resting on the rear side, such a configuration is exemplary only as the deck may be oriented along most any side when in the vertical storage orientation.

Exemplary embodiments may include one or more storage wheels to support the mower upon the ground surface 101 when the mower is in the vertical storage orientation. For example, as shown in FIGS. 1-5, the deck 102 may be equipped with two or more, e.g., four, storage wheels 202 mounted along the rear side of the deck. As indicated in FIG. 2, the storage wheels may be in contact with, and support the mower (e.g., deck) in rolling engagement with, the ground surface 101 when the deck/mower is in the vertical storage orientation. Once again, while shown as mounted along the rear side of the deck, other embodiments may place the storage wheels 202 along any other (e.g., front, left, or right) side of the deck.

The storage wheels 202 (as well as the wheels 302, 402, 502, and 802 described below) may be elevated above the ground surface 101 when the mower 100 is in the horizontal operating orientation (see FIG. 1), yet be in contact with, and support the mower (e.g., deck) in rolling engagement with, the ground surface when the deck is in a vertical storage orientation (see FIG. 2).

While the exact configuration of the storage wheels may vary, they may, in one embodiment, each have a rolling diameter that is 50% or less, e.g., 20-40%, of a rolling diameter of one or more of the support wheels. For example, in one embodiment, the support wheels 106, 108 have a rolling diameter of 8 inches, and the support wheels 202 have a rolling diameter of 2-3 inches.

Figure 5:
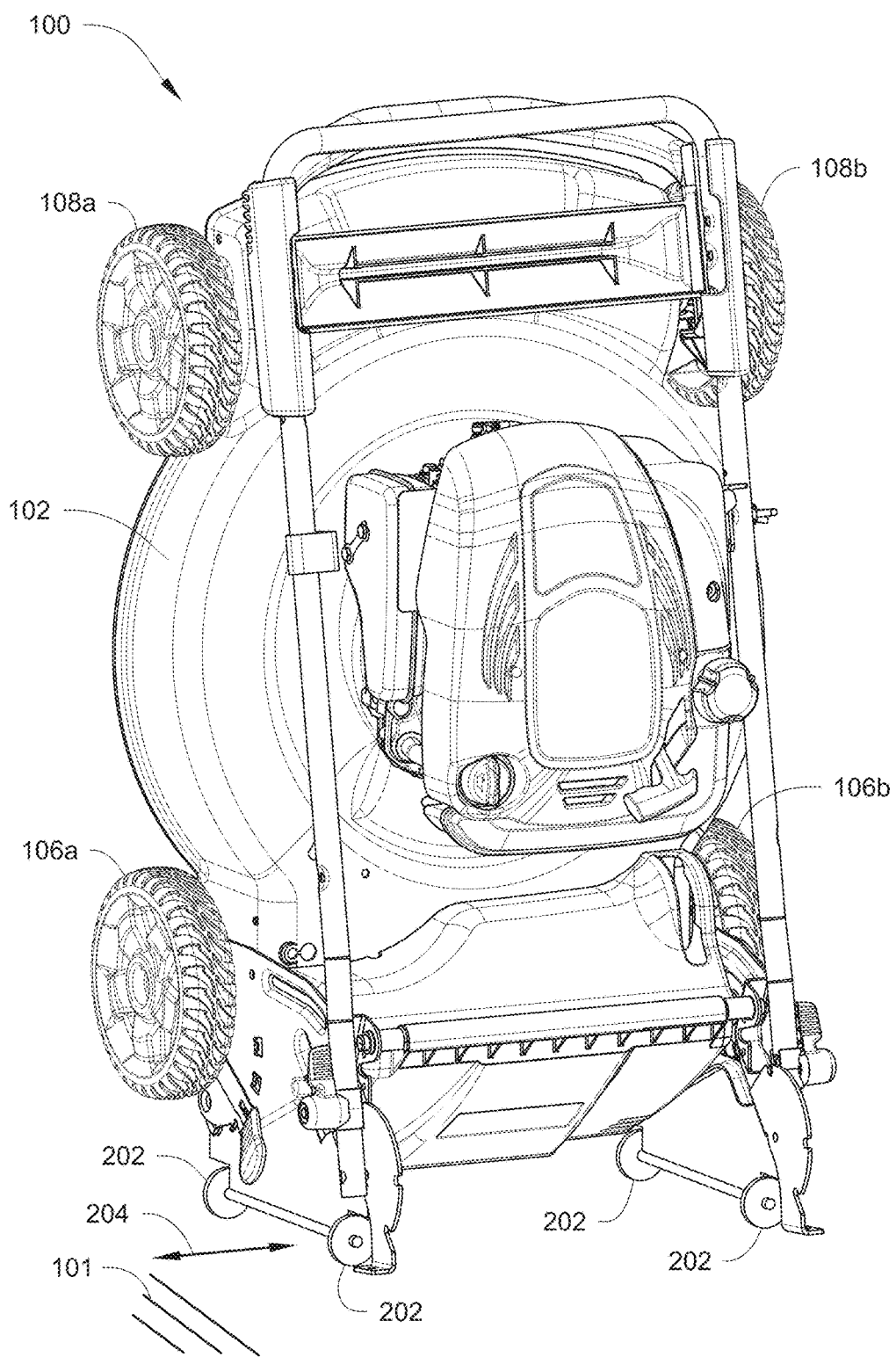
FIG. 5 is a perspective view of the mower of FIG. 2.

FIG. 5 illustrates a perspective view of the mower 100 in the vertical storage orientation. As shown in this view (as well as in FIG. 2), the storage wheels 202 may allow the mower to be rolled, e.g., along a garage floor or other ground surface 101 into spaces that the mower may not fit within when in the horizontal operating orientation. Moreover, the rolling engagement provided by the storage wheels 202 permits the mower 100 to be easily moved (e.g., rolled) even after it has been placed in the vertical storage orientation.

In the embodiment illustrated in FIGS. 1-5, the storage wheels 202 allow the mower to move in a side-to-side (e.g., transverse) direction 204 (e.g., in a direction that is parallel to a rotational axis of at least one of the wheels 106, 108). Stated alternatively, the four storage wheels 202 are each adapted to rotate about an axis 206 that is perpendicular to the ground surface 101 when the mower (body or deck 102) is in the horizontal operating orientation as shown, e.g., in FIG. 3.

Figure 6:
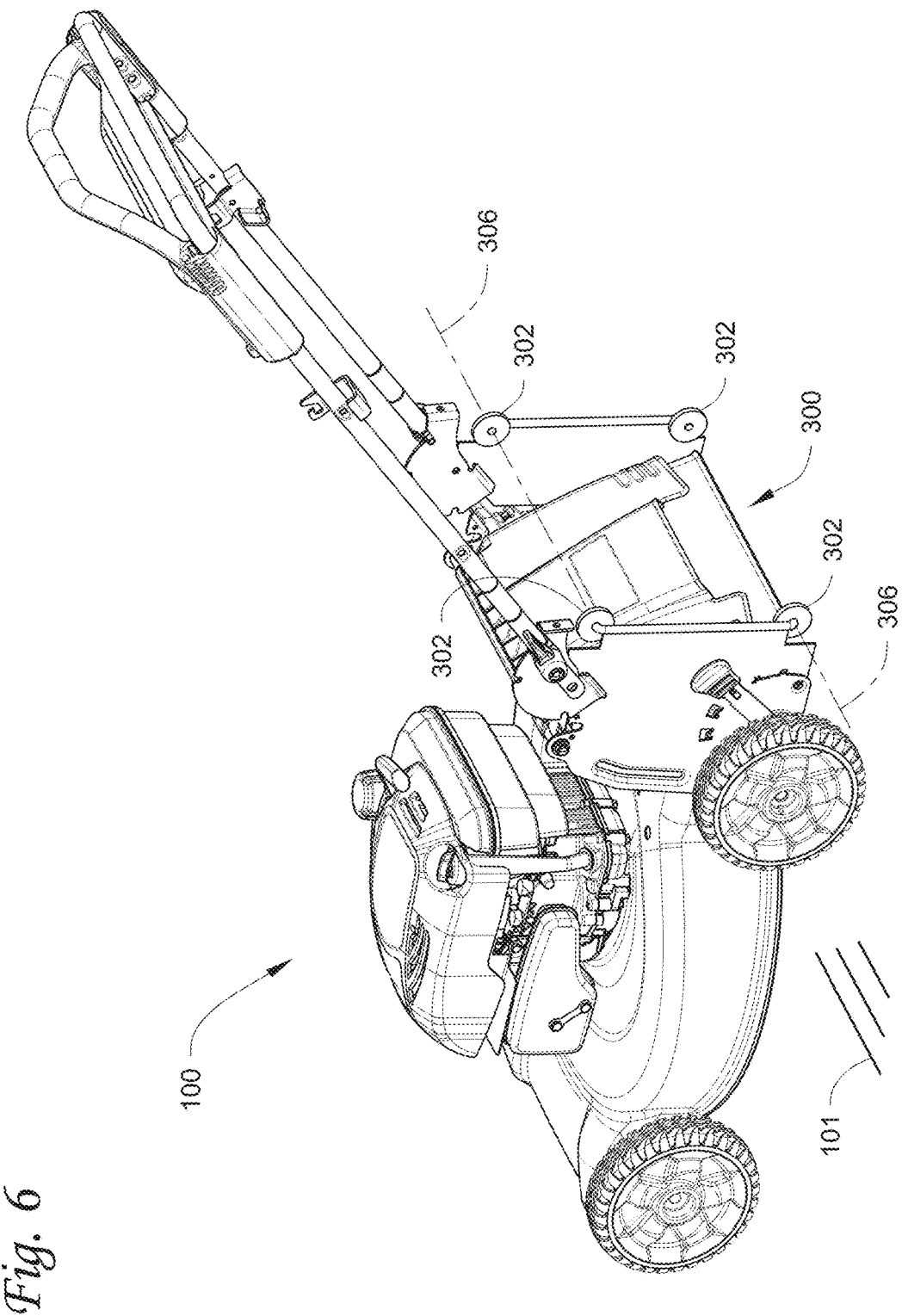
FIG. 6 is a perspective view, similar to FIG. 1, of the lawn mower incorporating vertical storage wheels in accordance with another embodiment.

However, such a configuration is not limiting. For instance, FIG. 6 illustrates a variation of the mower 100 having a carriage 300 and wheels 302. Other than the wheels 302, the mower illustrated in FIGS. 6 (and 7-14) is similar to the mower 100 already described herein and, as such, common aspects are not further described herein.

Like the carriage 200, the carriage 300 may include two or more wheels (e.g., four wheels 302). However, unlike the wheels 202, the wheels 302 are each adapted to rotate about an axis 306 that is parallel to the ground surface 101 (and parallel to an axis of one or more of the support wheels) when the mower (deck) 102 is in the horizontal operating orientation as shown in FIG. 6 (as well as when the mower is in the vertical storage orientation (not shown)). As a result, the mower 100 shown in FIG. 6 may be configured to roll in a fore-and-aft direction (e.g., a direction perpendicular to a rotational axis of at least one of the wheels 106, 108) when in the vertical storage orientation.

Figure 7:
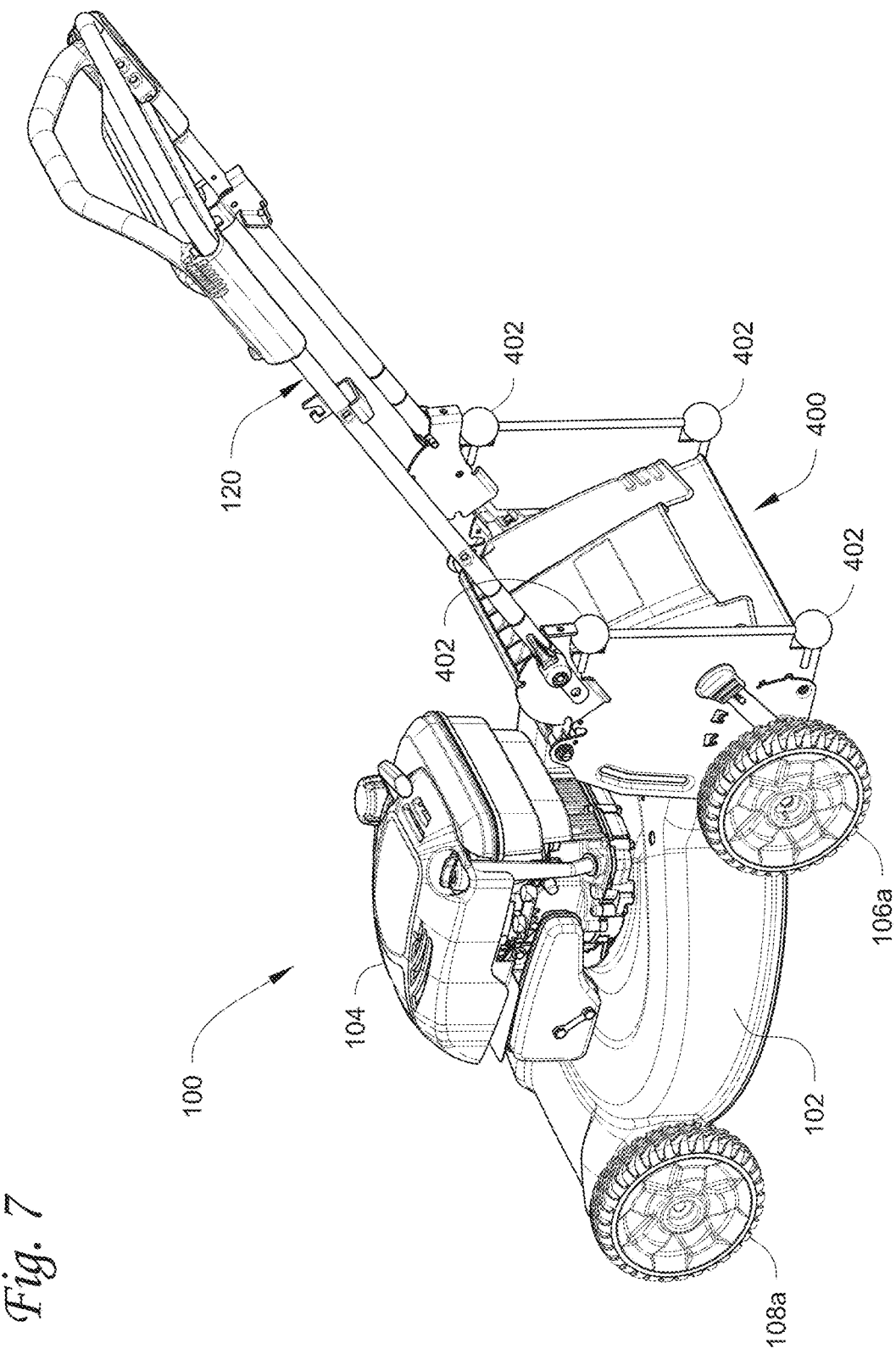
FIG. 7 is a perspective view, similar to FIG. 1, of the lawn mower incorporating vertical storage wheels in accordance with yet another embodiment.

FIG. 7 illustrates yet another embodiment of the mower 100 that is similar in most respects to the mowers 100 of FIGS. 1-6. For example, the mower 100 of FIG. 7 may include a carriage 400 having two or more, e.g., four wheels 402. Unlike the wheels 202 and 302, however, the wheels 402 may be configured as caster wheels, permitting the mower to roll in most any direction after the mower reaches the vertical storage orientation. While shown as using caster wheels, the wheels 402 could be most any multi-axis wheel configuration that allows the wheel to roll effectively about two or more axes (e.g., any wheel that may spin about more than one axis or may spin about a single but re-orientable axis).

While the above-described configurations are shown with four storage wheels (e.g., 202, 302, and 402) configurations where only three such wheels are provided are contemplated as such configurations could still support the mower in the vertical storage configuration while permitting the desired rolling ground contact.

Figure 8:
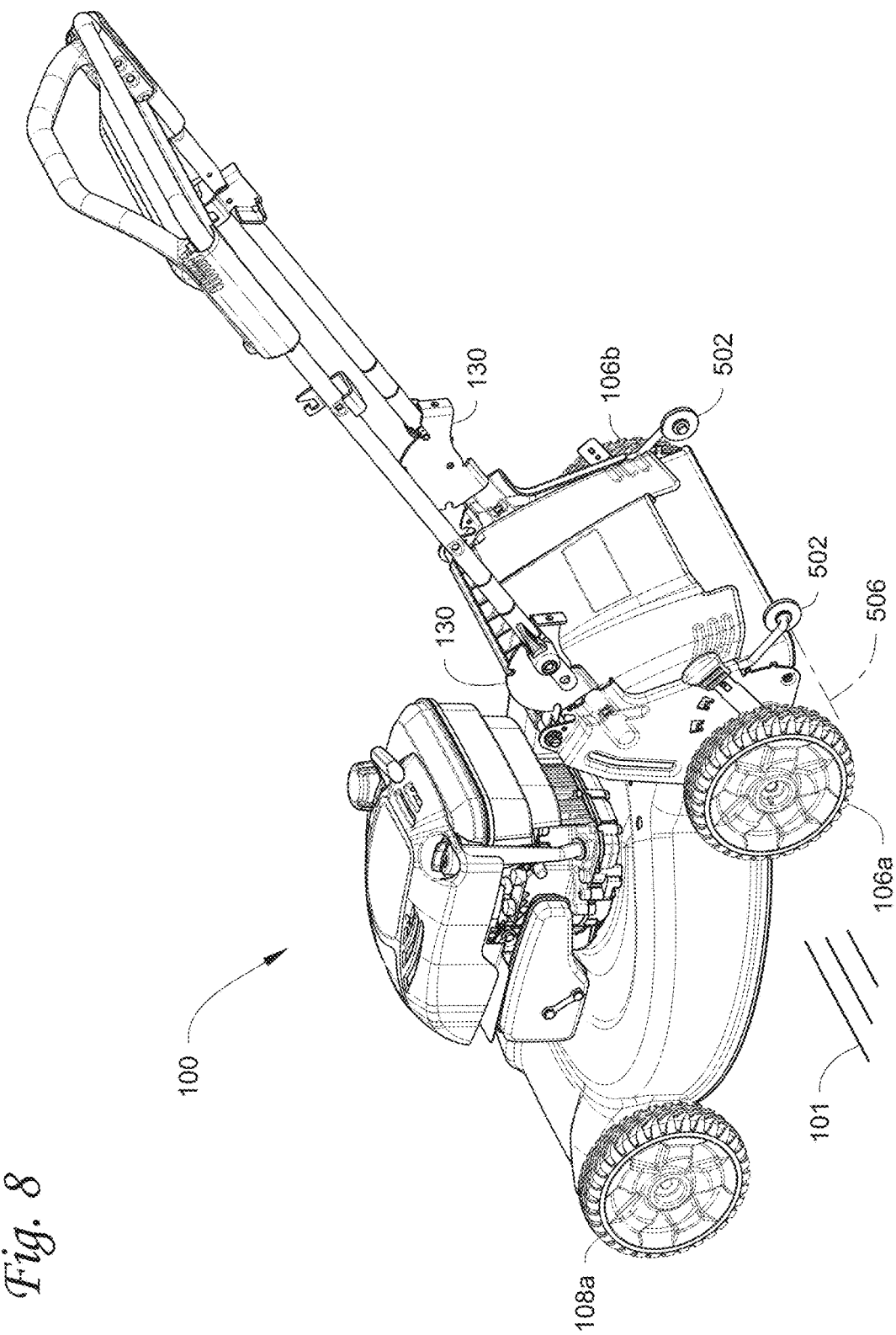
FIG. 8 is a perspective view, similar to FIG. 1, of the lawn mower incorporating vertical storage wheels in accordance with still another embodiment, the lawn mower (e.g., deck) shown in the horizontal operating orientation.
Figure 9:
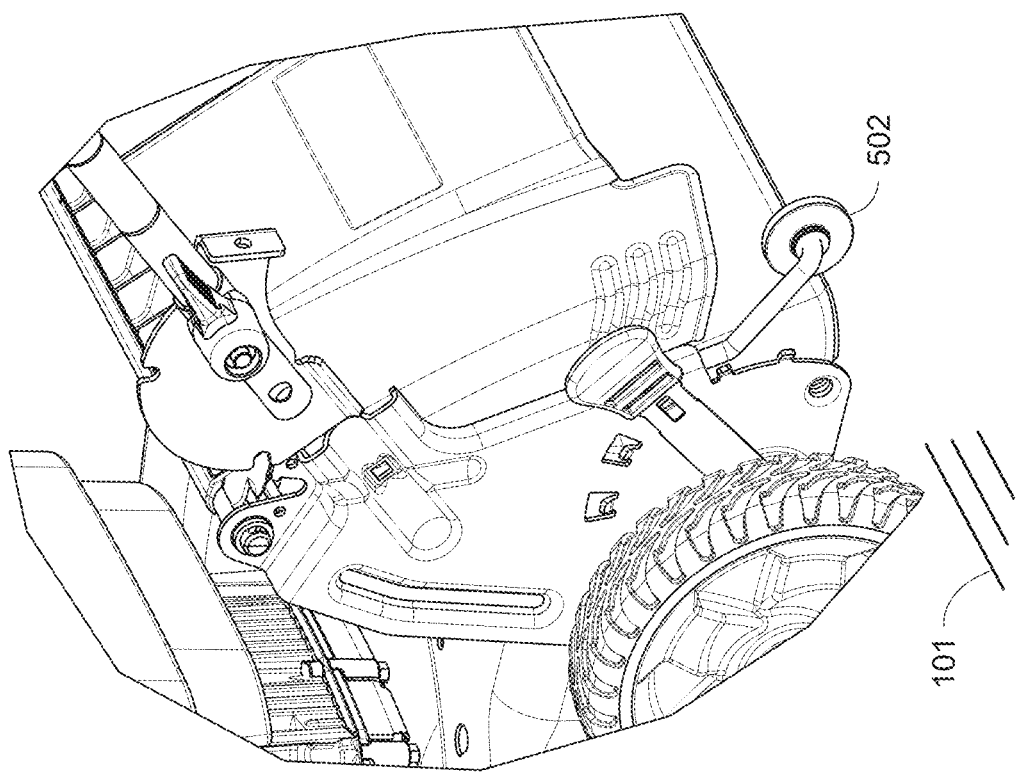
FIG. 9 is an enlarged partial perspective view of a portion of the mower of FIG. 8.
Figure 10:
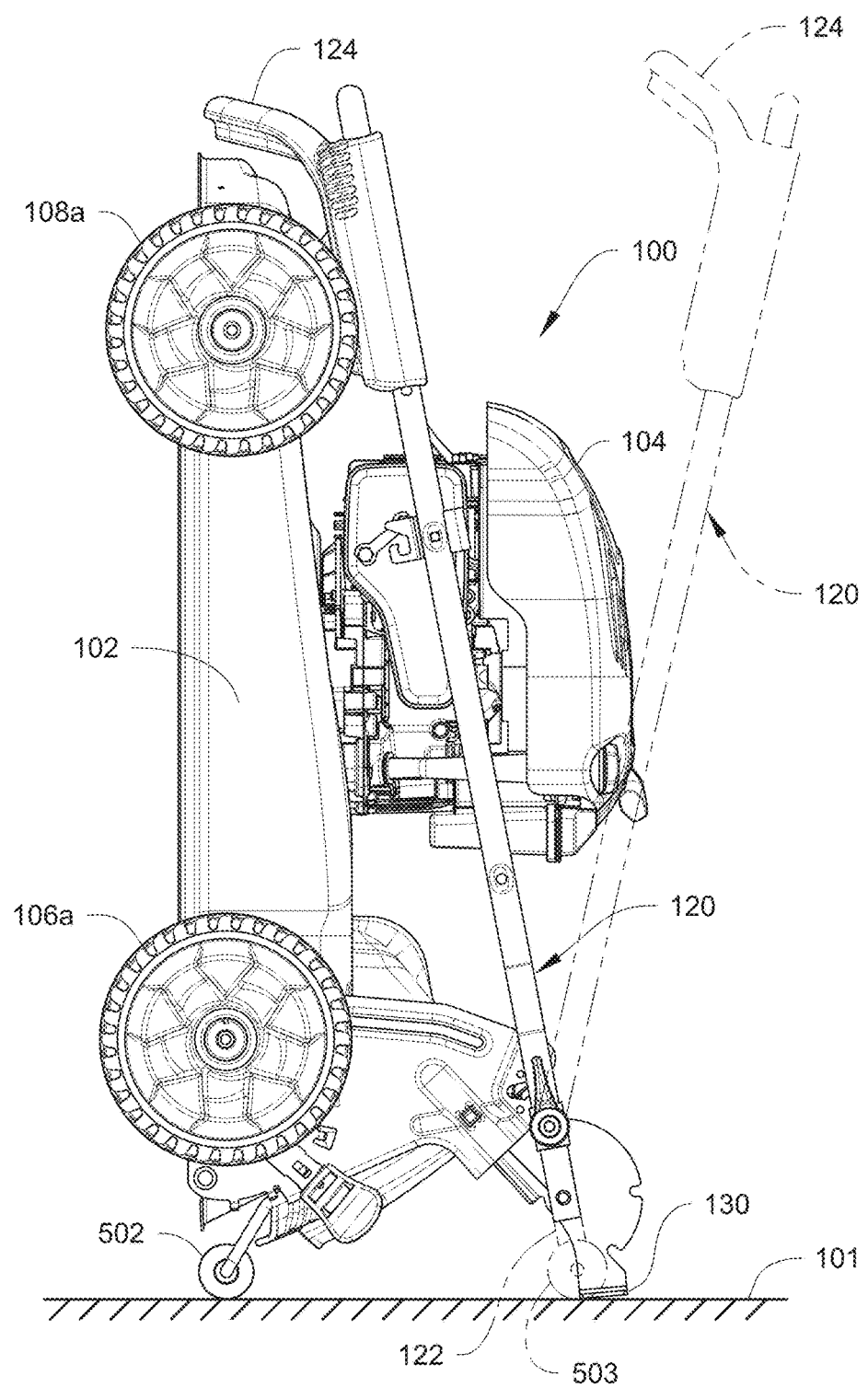
FIG. 10 is a side elevation view of the mower of FIG. 8 after movement of: the handle assembly to a collapsed position; and the mower (e.g., deck) to a vertical storage orientation.

FIGS. 8-10 illustrates the exemplary mower 100 in accordance with still yet another configuration. As shown in this view, the mower is again generally identical to the mower 100 already described herein, with the exception of the storage wheel configuration and related mower structure. As shown in FIGS. 8 and 9, the mower may include one or more, e.g., two, storage wheels 502. As with the storage wheels 302, the storage wheels 502 are each adapted to rotate about an axis 506 that is parallel to the ground surface 101 (in both operating and storage orientations) as shown in FIG. 8. The axis 506 may also be parallel to axes of the two rear wheels 106.

With the two wheel configuration provided by the storage wheels 502 of FIGS. 8-10, at least one additional ground contact element may be used to provide desired stability when the mower 100 is in the vertical storage orientation. As shown in FIG. 10, this additional ground contact element is provided by a portion of the index plate 130. While both index plates 130 may be used as ground contact elements, those of skill in the art will appreciate that contact by only a single index plate may suffice when two storage wheels 502 are utilized as shown.

The mower 100 of FIGS. 8-10 differs somewhat from the mowers described above in that it may require a slight tilting force to be applied to the mower to transfer the entire weight of the mower to the storage wheels 502 before rolling. However, if the ground surface 101 is relatively smooth (e.g., a concrete garage floor) such tilting may be minimal or even unnecessary as the index plates may slide upon the ground surface. A pad or low friction coating may be applied to the ground contact area of the index plates 130 to better permit such sliding contact.

As is evident in the figures, the grip handles 124 of the handle assembly 120 may be positioned, when the handle assembly is in the collapsed position, for convenient grasping by the operator. Accordingly, the mower 100 of FIGS. 8-10 may be conveniently tilted by the operator, via the grip handle 124, and transported in a manner similar to wheeled luggage.

In alternative embodiments, the handle assembly 120 may be moved to (and locked in) a position that is between the operating position (see e.g., FIG. 8) and the collapsed position (see, e.g., solid line rendering of handle assembly 120 in FIG. 10). For example, the handle assembly may be placed in a partially collapsed position as indicated by the broken line rendering of the handle assembly 120 in FIG. 10. Such a partially collapsed position may allow, at least in some instances, more convenient gripping of the handle assembly 120 and/or better operator maneuverability of the mower 100 when the mower is in the vertical storage orientation.

In other embodiments, the mower 100 could include storage wheels 503 located elsewhere (as compared to the wheels 502) on the body/deck 102. For example, the wheels 503 could be mounted on the index plates 130 as indicated in FIG. 10. Alternatively, the wheels 503 could attach to the deck indirectly, e.g., a wheel 503 could attach to an extension (see broken line extension in FIG. 10) of each handle tube 122. In the case of the latter, the wheels 503 may move into the illustrated position when the handle assembly 120 is moved to the collapsed (or partially collapsed) position, and move to a location closer to the deck 102 when the handle assembly is in the operating position. The wheels 503 may be provided either as a replacement for, or as a supplement to, the storage wheels 502.

Figure 11:
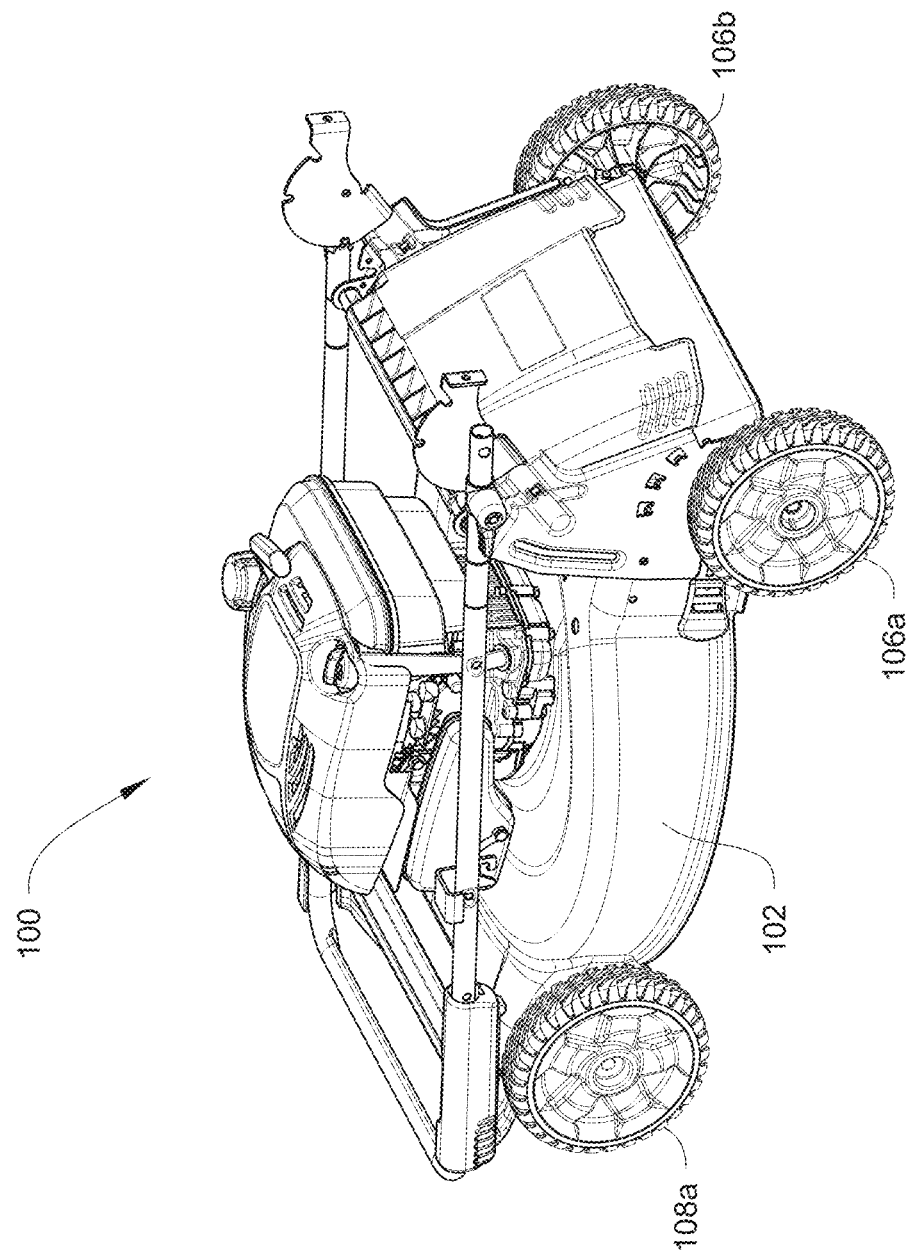
FIG. 11 is a perspective view of a lawn mower in accordance with another embodiment, wherein the mower incorporates wheels that function both as horizontal support wheels and as vertical storage wheels, the mower (e.g., the deck) shown in a horizontal operating orientation with the handle assembly shown in a collapsed position.
Figure 12:
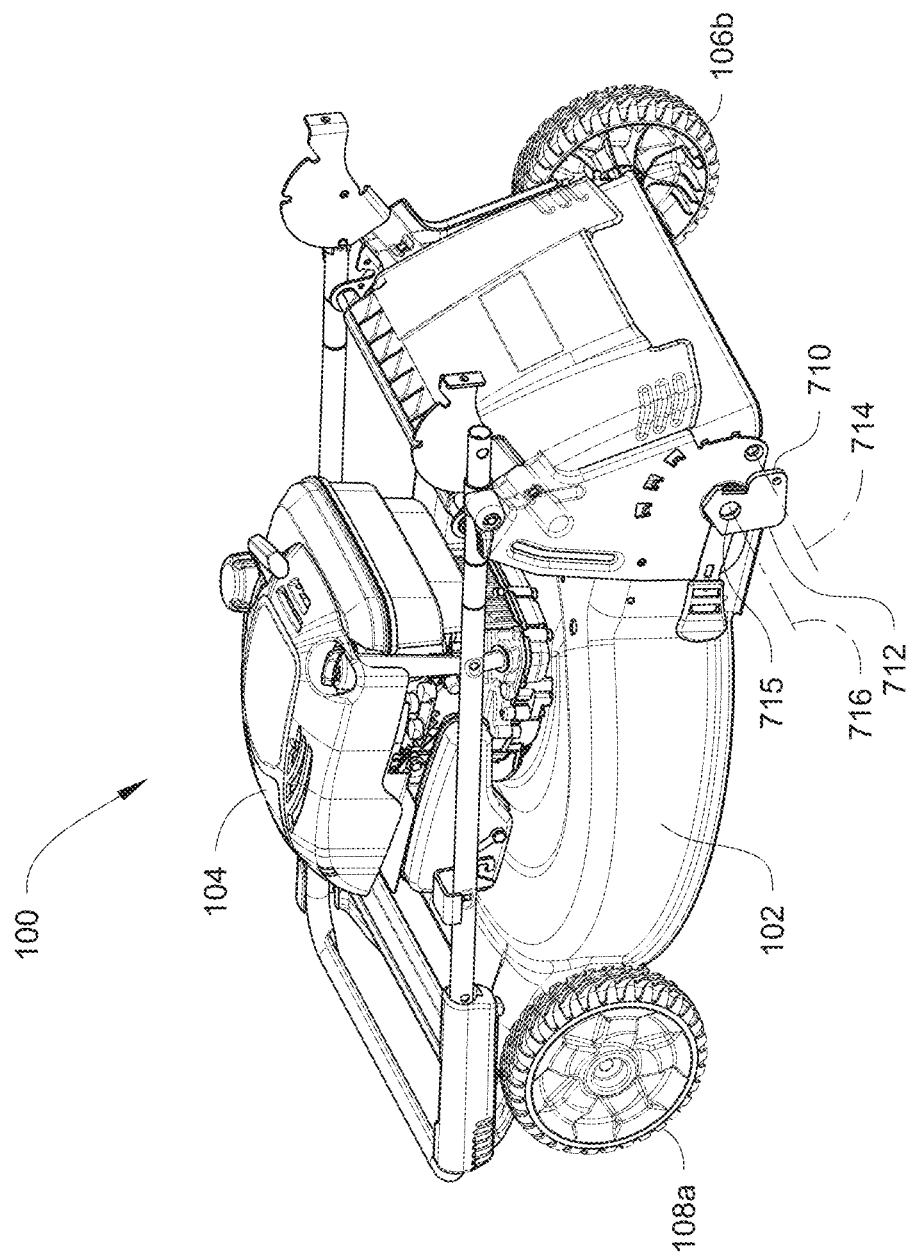
FIG. 12 is a perspective view of the mower of FIG. 11 with a rear support wheel removed.
Figure 13:
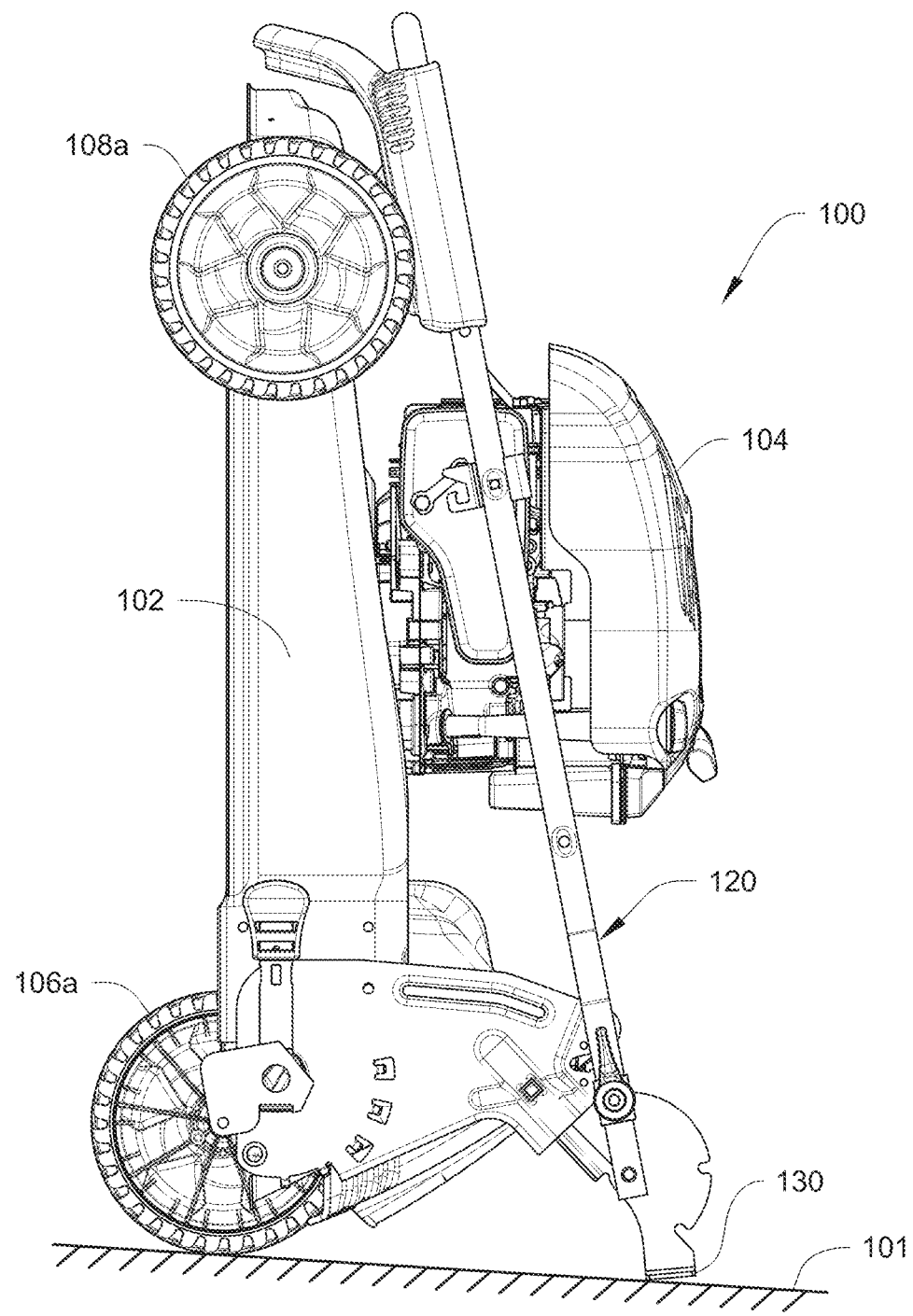
FIG. 13 is a side elevation view of the mower (e.g., deck) of FIG. 11 in a vertical storage orientation.

FIGS. 11-13 illustrate another embodiment of a mower 100 that incorporates yet another vertical storage solution. In this particular embodiment, each of the rear support wheels 106 may attach to the deck 102 via a height of cut adjustment mechanism 710 (see FIG. 12) adapted to attach and position the two rear wheels in one or more operating positions (e.g., a range of typical height of cut settings), wherein outer surfaces of the two rear wheels are inboard of the rear edge or side of the deck 102. However, the adjustment mechanisms 710 may also move and lock each rear wheel 106 in a storage position, wherein the outer surfaces of the two rear wheels extend outwardly (rearwardly) beyond the rear edge or side of the deck 102. As a result, the rear wheels 106 may transition from support wheels during mower operation, to storage wheels during mower storage.

The adjustment mechanism is partially shown in FIG. 12. As indicated in this view, the mechanism may include a lever arm 712 to which the associated rear wheel 106 is mounted for rotation about an axis 714. The lever arm 712 may then be rotated by a shaft 715 extending from side-to-side and having an axis 716 parallel to the rear wheel rotation axis 714. Rotation of the lever arm 712 (as a result of manipulating a height of cut mechanism (not visible) on the right side of the mower) may produce a relatively large swing in location of the wheel rotation axis 714 such that the each rear wheel may be swung to a substantially rear position as shown in FIGS. 11-13 when the operator wishes to store the mower.

When the rear wheels 106 are placed in their most rearward position (see FIG. 13), they may, as indicated above, extend beyond a rearmost edge of the deck 102. As a result, they may be used in place of independent storage wheels. Like the storage wheel configuration shown in FIGS. 8-10 though, the embodiment of the mower 100 shown in FIGS. 11-13 may also benefit from additional ground contact elements provided by, for example, the index plates 130 as shown. Again, the mower 100 of FIG. 11-13 may require a slight tilting force to be applied to the mower 100 to transfer the entire weight of the mower to the wheels 106 unless the ground surface 101 is relatively smooth, in which case the index plates may slide across the ground surface. A pad or low friction coating may again be applied to the ground contact area of the index plates 130 to better permit such sliding contact.

Figure 14A:
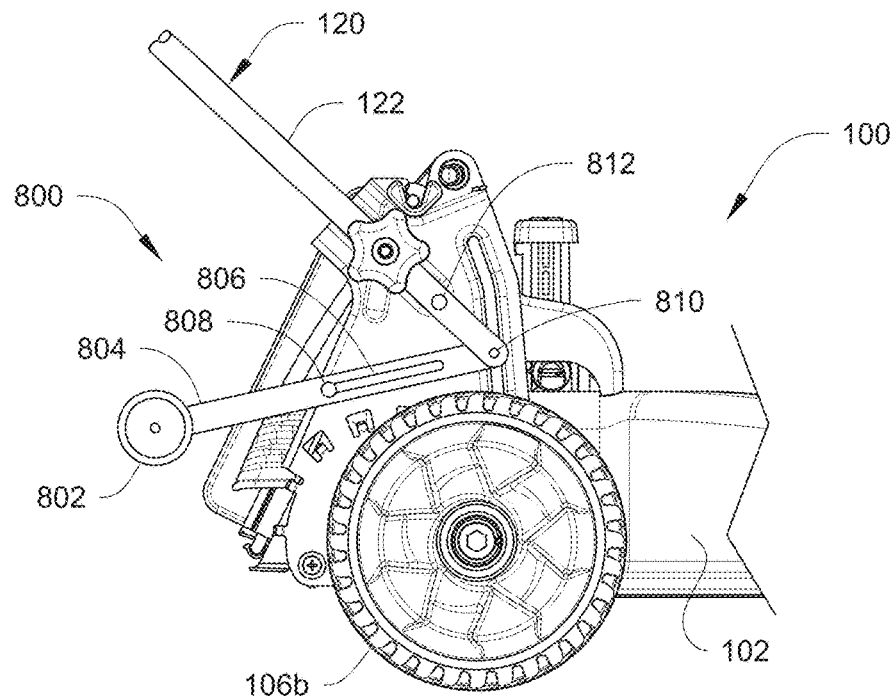
Figure 14B:
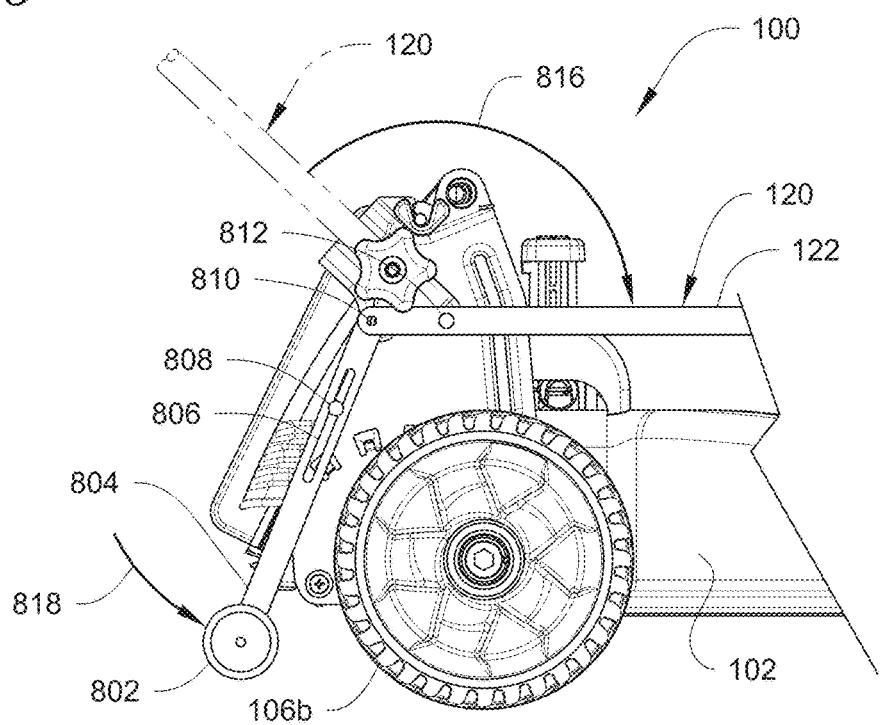

FIGS. 14A-14B illustrate yet another embodiment of the mower 100 (mower shown only partially). Like the mowers described above (see, e.g., FIGS. 8-10), the mower 100 may, in this embodiment, include a deck 102 with rear support wheels 106. It may further include storage wheels, e.g., two storage wheels 802, which are functionally equivalent to other storage wheels (e.g., wheels 502) described elsewhere herein. However, unlike many of the storage wheel configurations described and illustrated herein, the mower 100 of FIGS. 14A-14B may include a storage wheel actuation mechanism 800 operable to move the storage wheels 802 between a first or stowed position (as shown in FIG. 14A) to a second or deployed position (as shown in FIG. 14B). While movement of the storage wheels 802 between these two positions may be accomplished in various ways, it may, in some embodiments, be accomplished via movement of the handle assembly 120 from the operating position of FIG. 14A to the collapsed position (see solid line rendering) of FIG. 14B.

For instance, in one embodiment, each storage wheel 802 (there may be a storage wheel on each side of the mower 100) may be connected to a first end of a leg 804 operatively connected to the handle assembly 120. The leg 804 may define a longitudinal slot 806 through which a pin 808 (attached to the deck 102) passes. Accordingly, the leg 804 may both translate along the slot 806 and rotate about the pin 808. A second end of the leg 804 may attach to an end of its respective handle member 122 via a pivot joint 810 as shown in FIG. 14A. The handle tubes 122 may again be adapted to pivot, relative to the deck 102, e.g., about a pivot 812.

The storage wheels 802 may be positioned in their stowed or elevated position during mower operation as shown in FIG. 14A. However, when the handle assembly 120 is pivoted from the operating position of FIG. 14A to the collapsed position of FIG. 14B (in the direction of arrow 816), the pivot 810 may cause the leg 804 to pivot about, and translate along, the pin 808 until reaching the position shown in FIG. 14B, causing the wheels 802 to move to the deployed position as shown (as represented by arrow 818). In the deployed position, the storage wheels 802 may, in conjunction with other parts of the mower (e.g., index plate 130 of FIG. 10), support the mower in the vertical storage orientation.

While illustrated herein as a translating/pivoting leg 804, storage wheel actuation mechanisms in accordance with embodiments of the present disclosure may take many forms, including four-bar linkages, simple lever mechanisms, etc. For example, the wheels 802 could simply attach to extending ends of the handle tubes 122 in a manner similar to that described with reference to FIG. 10. In fact, most any mechanism that can displace the storage wheels in a manner similar to that shown and/or described herein may be acceptable.

Storage wheel actuation mechanisms may be useful where the mower 100 benefits from placing the storage wheels in a different location during mower operation than during mower storage. For example, the storage wheels 802, when in the desired deployed position of FIG. 14B, may be too low to the ground surface for normal mower operation, e.g., they could interfere with mower traversal of undulating terrain. Accordingly, the storage wheel actuation mechanism 800 may elevate the storage wheels 802 to a higher elevation as shown in FIG. 14A during mower operation while still permitting the desired position of the storage wheels for vertical storage.

While not illustrated, the storage wheel actuation mechanism could, in other embodiments, draw the storage wheels 802 closer to the mower body (e.g., deck 102) when in the stowed position. Such an embodiment may be beneficial to, for example, ensure the storage wheels do not interfere with other mower components, e.g., do not interfere with grass catcher removal/attachment.

Embodiments of the present disclosure may thus provide a grounds maintenance apparatus such as a lawn mower having a plurality of support wheels to support the apparatus in rolling engagement with a ground surface when the apparatus is in a horizontal operating orientation. Further, two or more storage wheels may be provided to support the apparatus in rolling engagement with the ground surface when the apparatus is in a vertical storage orientation. In some embodiments, two or more of the support wheels may be repositioned to form the storage wheels. In other embodiments, a storage wheel actuation mechanism may allow the storage wheels to be moved between a stowed position (for when the mower is in the horizontal operating orientation) and a deployed position (prior to the mower being placed in the vertical storage orientation).

The complete disclosures of the patents, patent documents, and publications cited herein are incorporated by reference in their entirety as if each were individually incorporated.

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. A grounds maintenance apparatus comprising:
   a body supporting a ground-working tool, wherein the body comprises front and rear sides and left and right sides;
   a plurality of support wheels mounted to the body and adapted to support the body in rolling engagement with a ground surface while the body is in a horizontal operating orientation;
   a plurality of storage wheels connected to the body along one of the sides, wherein the plurality of storage wheels are adapted to move from a first or stowed position when the body is in the horizontal operating orientation, to a second or deployed position when the body is in a vertical storage orientation; and
   a storage wheel actuation mechanism coupled to the body and adapted to move the plurality of storage wheels between the first or stowed position and the second or deployed position.

2. The apparatus of claim 1, wherein each of the plurality of storage wheels has a rolling diameter that is 50% or less of a rolling diameter of one of the plurality of support wheels.

3. A lawn mower comprising:
   a deck comprising an upper wall and downwardly extending sidewalls that together define a cutting chamber, wherein the deck comprises front and rear sides and left and right sides;
   a plurality of support wheels mounted to the deck and adapted to support the deck in rolling engagement with a ground surface when the mower is in a horizontal operating orientation;
   a plurality of storage wheels mounted to the deck along one of the front, rear, left, or right sides, wherein the plurality of storage wheels are elevated above the ground surface when the mower is in the horizontal operating orientation, and are in contact with the ground surface when the mower is in a vertical storage orientation, and wherein the plurality of storage wheels are adapted to move from a first or stowed position to a second or deployed position;
   an operator handle assembly pivotally connected to the deck and movable between: an operating position corresponding to the mower being in the horizontal operating orientation; and a collapsed position accommodating the mower being in the vertical storage orientation; and
   a storage wheel actuation mechanism coupled to the deck and adapted to move the plurality of storage wheels from the first or stowed position to the second or deployed position.

4. The mower of claim 3, wherein the plurality of support wheels comprises left and right front support wheels located at or near the front side of the deck, and left and right rear support wheels located at or near the rear side of the deck.

5. The mower of claim 3, wherein the plurality of storage wheels comprise two wheels each adapted to rotate about an axis that is parallel to an axis of at least one of the plurality of support wheels.

6. The mower of claim 3, wherein the storage wheel actuation mechanism is connected to the handle assembly such that the storage wheels move from the first or stowed position to the second or deployed position when the handle assembly is moved from the operating position to the collapsed position.

7. A method of storing a walk-behind lawn mower comprising:
   moving a handle assembly of the mower from an operating position to a collapsed position;
   moving a plurality of storage wheels from a first or stowed position to a second or deployed position;
   lifting a first side of the deck of the mower until ground support wheels at or near the first side of the deck are elevated above a ground surface; and
   supporting the mower, in a vertical storage position upon the ground surface, with the plurality of storage wheels located along a second side of the deck opposite the first side.

8. The method of claim 7, further comprising rolling the mower, on the plurality of storage wheels, in a direction parallel to a rotational axis of at least one of the ground support wheels.

9. The method of claim 7, further comprising rolling the mower, on the plurality of storage wheels, in a direction perpendicular to a rotational axis of at least one of the ground support wheels.

* * * * *